J. HUTCHINSON.
STAND FOR BICYCLES.
APPLICATION FILED DEC. 16, 1919.
1,374,452.
Patented Apr. 12, 1921.
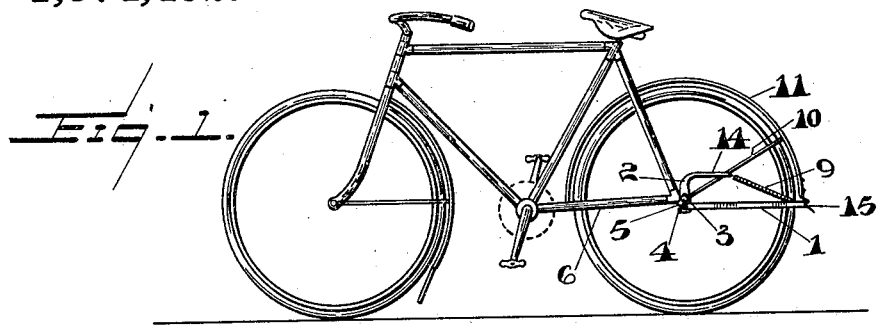
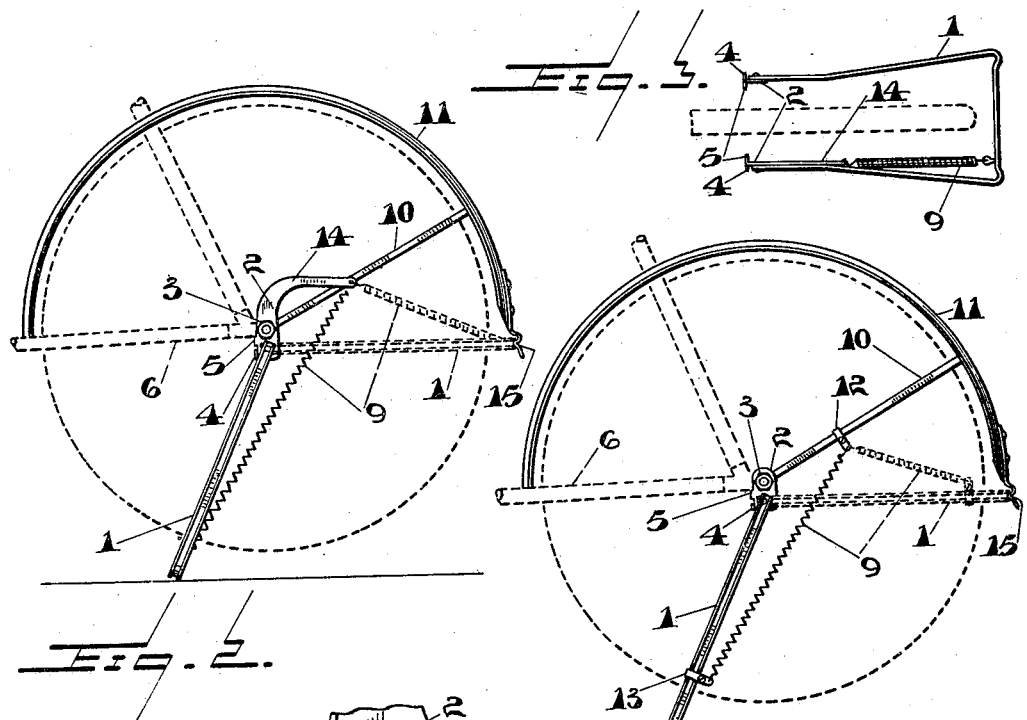
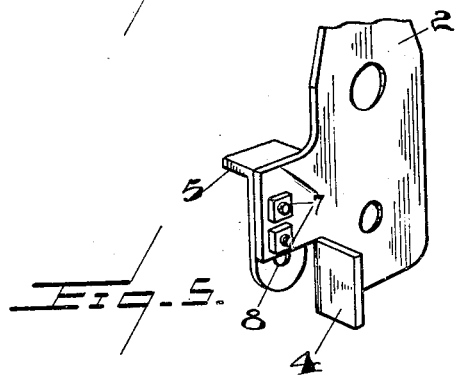
INVENTOR
J. Hutchinson.
BY J. Edward Maybee,
ATTY.

UNITED STATES PATENT OFFICE.

JOHN HUTCHINSON, OF TORONTO, ONTARIO, CANADA.

STAND FOR BICYCLES.

1,374,452. Specification of Letters Patent. Patented Apr. 12, 1921.

Application filed December 16, 1919. Serial No. 345,201.

*To all whom it may concern:*

Be it known that I, JOHN HUTCHINSON, of the city of Toronto, in the county of York, Province of Ontario, Canada, have invented certain new and useful Improvements in Stands for Bicycles, of which the following is a specification.

This invention relates to stands particularly adapted for use with ordinary foot propelled bicycles, and my object is to devise a stand which, while easily moved down to its operative position, will automatically spring up and lock itself in its inoperative position when the rider lifts the rear wheel of his bicycle sufficiently to take its weight off the stand, or starts the bicycle forward.

I attain my object by means of the constructions hereinafter described and illustrated in the accompanying drawings in which—

Figure 1 is a side elevation of a bicycle provided with my improved stand showing it in its inoperative position;

Fig. 2 a side elevation of the rear portion of the bicycle on a larger scale showing the stand in its operative position;

Fig. 3 a plan view of the stand itself;

Fig. 4 a view similar to Fig. 2 showing a slight modification; and

Fig. 5 a perspective detail of one of the adjustable stand connections.

In the drawings like numerals of reference indicate corresponding parts in the different figures.

1 is a U-shaped stand of ordinary construction, which is preferably of channel bar section as shown. This form not only gives the stand the necessary stiffness combined with light weight, but lends itself for use with the form of spring latch I employ to retain the stand in its inoperative position. The ends of the sides of the stand are pivotally connected to the stand connections 2, which are secured in position on the rear axle of the bicycle by means of the nuts 3, which secure the axle in position. These connections are preferably formed of stampings and each has a shoulder 4 stamped up thereon against which the stand lies to limit the forward movement of the stand past the vertical as indicated in Figs. 2 and 4. Each connection is also provided with a lug 5 adapted to engage beneath a part of the frame 6 of the bicycle to resist the twisting of the connections on the axle under the strain of the stand when the bicycle is supported thereon.

As bicycles vary somewhat in details and frame construction, I find it preferable to make this lug 5 adjustable so that the connection may be rotarily adjusted on the axle to bring the stand to the proper angle to the vertical when the bicycle is supported thereon. I therefore prefer to form a lug of the L-shape shown in Fig. 5, and to secure it to the connection by means of the bolts 7 passing through holes in one of the parts and through a slot 8 in the other. To raise the stand when the weight of the bicycle is taken off it, I provide a coil spring 9. One end of this spring is secured to the stand and the other to an arm extending upwardly and rearwardly from one end of the axle of the bicycle. This arm may be an arm 10 adapted to brace the mud guard 11, or may be a separate part 14 formed on or directly connected with one of the connections 2. In Fig. 2 the arm 14 is shown as part of the connection 2 and the coil spring is secured to the middle portion of the U-shaped stand. In Fig. 4 one end of the coil spring is secured to a clip 12 fastened to the mud guard stay and the other end to a clip 13 secured to the side of the stand. In each case it will be noted that the points of connection of the spring to the stand and the arm are so positioned that the spring, when the stand is moved from the inoperative position to the operative position and vice versa, passes from one side to the other of a vertical position. The positions are also such that when the stand is in the operative position, the pull of the spring is very nearly parallel to the length of the stand, so that the tension of the coil spring has but a small effect in tending to swing the stand to its inoperative position. Two advantages result from this arrangement. In the first place, the stand will effectively support the bicycle since the weight of the rear part of the latter is sufficiently great to considerably overbalance the pull of the spring tending to swing up the stand. In the second place, the action of the pull of the spring after the stand passes the vertical is nearly at a maximum and snaps up the stand so rapidly that it flies up to its inoperative position with considerable force despite the fact that the tension of the spring is almost *nil* when the stand is in its inoperative position. Owing to the small tension of the spring when the stand is raised, I find it necessary to devise a special spring catch to hold the stand from displacement either upwardly or downwardly. For this purpose I employ a spring formed of a flat piece of spring metal secured to the lower end of the mud guard 11, which spring is bent to provide a convex and wedge-shaped portion 15 adapted to spring into the channel of the middle portion of the stand as shown particularly in Fig. 4. Though this catch holds very securely in the channel, the stand is readily disengaged by the pressure of the foot and forced down to the operative position.

What I claim as my invention is:—

1. The combination with a bicycle, of stand connections secured to the rear of the bicycle; a U-shaped stand having its ends pivotally secured to said connections; an arm extending upwardly and rearwardly from one of said connections; a coil spring secured at one end to said arm and at its other end to said stand adjacent to the free end; and a spring catch suitably supported from the frame of the bicycle adapted to releasably engage the middle of the stand to hold the latter in the operative position.

2. The combination with a bicycle, of stand connections secured on the ends of the rear axle of the bicycle; a U-shaped stand having its ends pivoted to said connections; each of said connections provided with a shoulder adapted to limit the forward movement of the stand past the vertical; a lug adjustable on the connections; adapted to engage the frame of the bicycle to resist the twisting of the connections on the axles under the strain of the stand where the bicycle is supported thereon.

Signed at Toronto, Ontario, this 2nd day of December, 1919.

JOHN HUTCHINSON.

Witnesses:
   J. S. RUTHERFORD,
   ANTONIO Y. MONK.